United States Patent [19]

Hansen

[11] Patent Number: 4,770,233

[45] Date of Patent: Sep. 13, 1988

[54] SPACE HEATING ELEMENT AND SHAPED INSULATED MOUNTING THEREFOR

[76] Inventor: Harold W. Hansen, 7150 Arbor Lake Dr., Wilsonville, Oreg. 97070

[21] Appl. No.: 530,374

[22] Filed: Sep. 8, 1988

[51] Int. Cl.[4] .................. F24H 9/06; F28F 1/02
[52] U.S. Cl. ........................ 165/56; 165/135
[58] Field of Search .............. 248/58, 61, 63, 62, 248/65, 232, 233; 219/342, 343, 345, 347, 354, 355, 357, 213; 165/49, 53, 56, 136, 135, DIG. 6, 50, 128, 132; 126/92 AC, 92 A, 92 B, ; 237/70, 54, 55, 69; 431/353; 47/17

[56] References Cited

U.S. PATENT DOCUMENTS

| D. 257,947 | 1/1981 | Reynoso | 248/62 |
|---|---|---|---|
| 1,025,243 | 5/1912 | Carpenter et al. | 248/62 |
| 1,398,168 | 11/1921 | Bakstad | 219/347 |
| 1,920,365 | 8/1933 | Del Mar | 165/128 |
| 2,439,038 | 4/1948 | Cartter | 126/92 B |
| 2,469,963 | 5/1949 | Grosjean et al. | 165/56 |
| 2,578,190 | 12/1951 | Kurtzon | 219/342 |
| 2,694,135 | 11/1954 | Brockmole | 219/354 |
| 2,925,977 | 2/1960 | Cononi | 248/62 |
| 2,946,510 | 7/1960 | Galvin | 237/70 |
| 3,008,030 | 11/1961 | Stanford et al. | 219/347 |
| 3,205,937 | 9/1965 | Shyffer | 165/DIG. 6 |
| 3,266,202 | 8/1966 | Furer | 248/58 |
| 3,283,124 | 11/1966 | Kawecki | 219/347 |
| 3,327,093 | 6/1967 | Hager, Jr. et al. | 219/354 |
| 3,359,965 | 12/1967 | Milligan | 126/92 B |
| 3,376,003 | 4/1968 | Zimmerman | 248/62 |
| 3,582,614 | 11/1971 | Zellers | 219/345 |
| 3,747,501 | 7/1973 | Honda et al. | 47/17 |
| 4,289,116 | 9/1981 | Williams | 47/17 |
| 4,319,125 | 3/1982 | Prince | 165/DIG. 6 |
| 4,390,125 | 6/1983 | Rozzi | 126/92 AC |
| 4,458,663 | 7/1984 | Kanesaka | 126/92 B |
| 4,493,468 | 1/1985 | Roach | 248/62 |

FOREIGN PATENT DOCUMENTS

| 10006 | of 1928 | Australia | 219/347 |
|---|---|---|---|
| 2744087 | 4/1979 | Fed. Rep. of Germany | 165/49 |
| 2471558 | 6/1981 | France | 219/345 |
| 636173 | 5/1983 | Switzerland | 248/65 |
| 25046 | of 1899 | United Kingdom | 219/213 |
| 289927 | 4/1928 | United Kingdom | 165/53 |
| 315067 | 7/1929 | United Kingdom | 165/53 |

Primary Examiner—G. P. Tolin
Assistant Examiner—Geoffrey S. Evans
Attorney, Agent, or Firm—Jack E. Day

[57] ABSTRACT

A radiant space heating element (12) in the shape substantially of an equilateral triangle for providing uniform distribution of heat by radiation from an interior space (32) that is a passage for an energy source such as hot water, steam, hot stack gases or any other source of infrared energy. The heating element (12) has two radiating surfaces which meet at a vertex (20) so that there is a substantial uniformity of temperature over an area on either side of a line directly under the heating element which is nearly equal to five times the separation of the heater element from the surface. The heating element (12) has insulation (14), a web element (36) that acts both to support the insulation (14) and as a reflector, and a bracket (16).

11 Claims, 1 Drawing Sheet

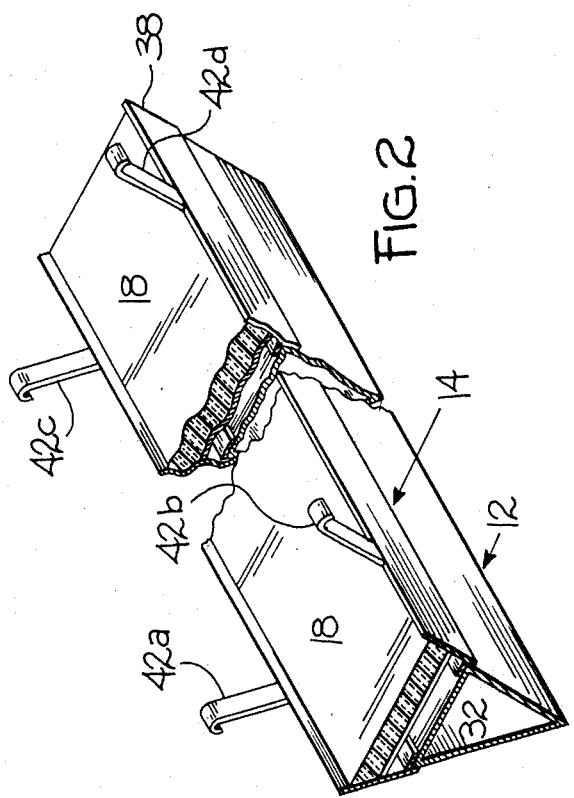
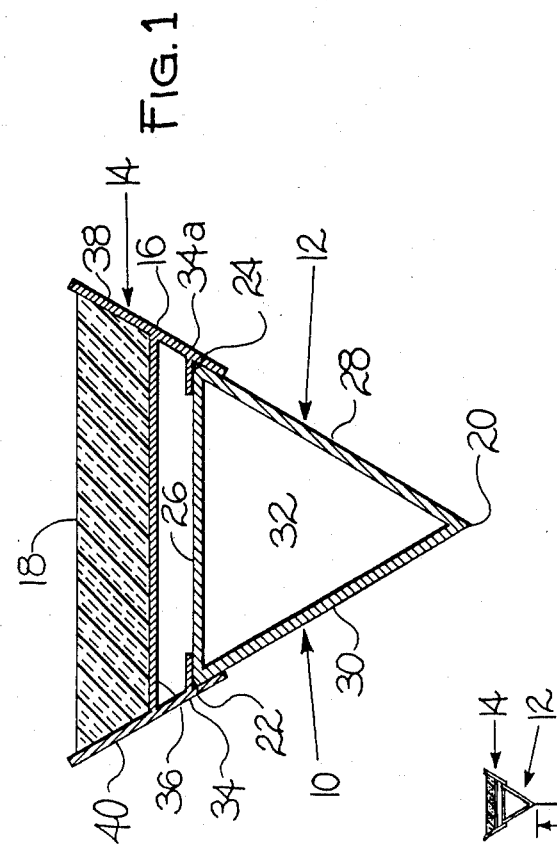
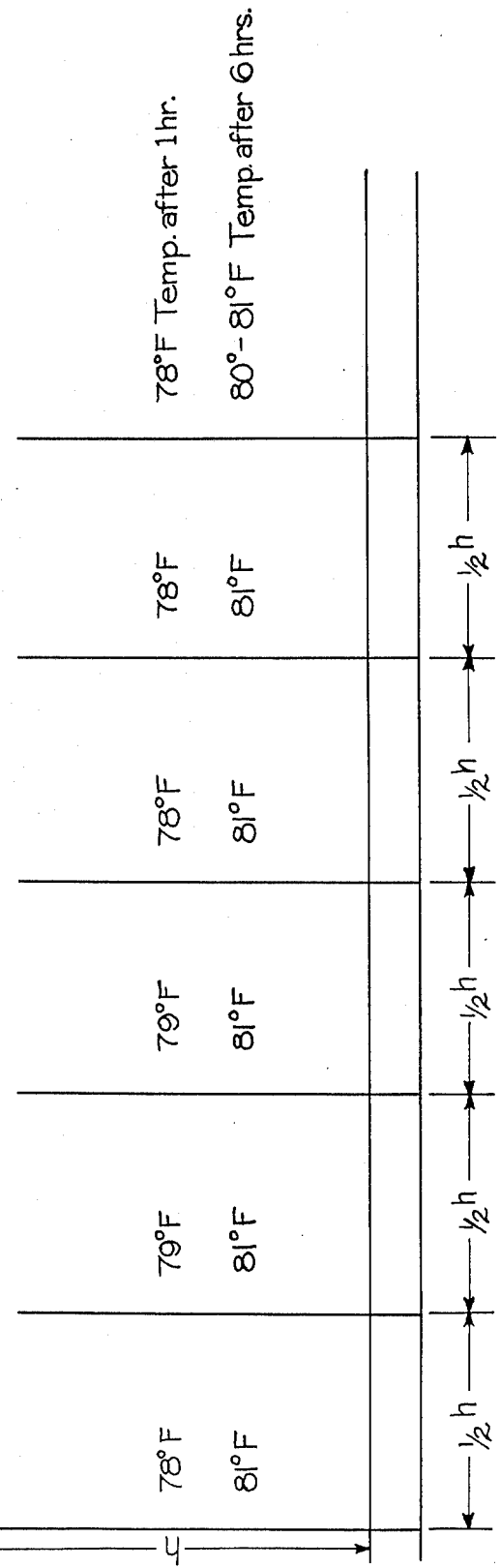

SPACE HEATING ELEMENT AND SHAPED INSULATED MOUNTING THEREFOR

BACKGROUND OF THE INVENTION

This invention relates to space heaters in general, and to triangularly shaped space heaters with shaped insulation to increase the efficiency and uniformity of heat distribution from such elements in particular.

Certain types of space heating situations require a uniform distribution of heat in those areas to be heated. Particularly is this true in greenhouses where any non-uniformity in heating is manifested by uneven growth of plants or even damage or death to some plants. This is most evident in greenhouses using round tubing through which burning gases are directed as the energy source, where the plants directly under the extended tubing will reveal a higher than normal number of yellowing leaves, and have a higher than normal number of dead and dying plants. Many growers have solved this problem by placing walkways under the heating elements, thus reducing the number of plants exposed to the greater heat. However, this arrangement may not be the most efficient arrangement of plants for the space. Other growers have installed the heating elements over existing walkways, which may not give the most effective distribution of heat.

Several existing space heating arrangements have used a shaped reflector to obtain a more even distribution of heat, as exemplified by U.S. Pat. No. 4,319,125. Other existing space heating devices have used triangular reflectors to direct the heat in a desired direction, of which U.S. Pat. No. 3,604,894 is exemplary. U.S. Pat. No. 3,731,055, on the other hand, discloses a triangularly shaped shield to decrease the amount of heat received by the area directly opposite the heating element. U.S. Pat. No. 2,598,602 discloses a triangularly shaped heating element with an apex facing in the direction to be heated, for the reason that it provides a more uniform distribution of heat. He also discloses a multiplicity of such elements, themselves arranged in a triangular array, with the array mounted vertically, so that a uniform beam of heat will be directed into the space to be heated. Nowhere is the idea expressed, or even hinted at, that a single element could be extended and used to obtain a uniform distribution of heat directly in front of, and on either side of, the element. Finally, U.S. Pat. No. 3,052,789 discloses a triangularly shaped element with insulation applied to the sides of the element, opposite to the direction in which the heat is to be directed. However, this latter disclosure shows the heat being directed from a flat side of the triangular shape and insulates the other two sides to prevent heat loss in those two directions.

None of the above mentioned disclosures would be adequate to solve the problem at hand, that of providing a uniform distribution of heat in a greenhouse in such a way that none of the plants receives too much heat and is thus damaged or destroyed. In fact, several of these disclosures have that very problem when used under such circumstances.

SUMMARY OF THE PRESENT INVENTION

The present invention discloses a heating element, which can be extended linearly, which has the shape of an equilateral triangle, with one of the apexes directed toward the area to be heated. It provides a more even distribution of heat, with little variation of temperature from a substantial distance on either side to the center, directly under the element. In a normal greenhouse environment, with the elements mounted at normal heights and spacings, variations of less than a degree or two in the area desired to be heated are not uncommon, and none of the plants receives a damaging amount of heat. Further, when the novel triangularly shaped heating element of the present invention is combined with a novel shaped insulator located on the planar side opposite the apex pointing in the direction to which the heat is directed, nearly all of the heat which would normally be lost upward is redirected downward, with a subsequent increase in efficiency. When the novel insulator is fabricated in accordance with the teachings of the disclosure, it also serves as a hanger for the heating element, resulting in substantial efficiencies in costs of fabrication and installation, as well as in operation.

It is, therefore, an object of the present invention to provide a space heating element giving a greater uniformity of heat distribution than heretofore available.

It is a further object of the present invention to provide a space heating element which reduces the amount of damaged plants encountered when used in a greenhouse environment.

It is yet another object of the present invention to provide a novel shaped insulator for use with the aforementioned space heating element.

It is a still further object of the present invention to provide a novel shaped insulator for the space heating element heretofore described which can also be used as a hanger for said space heating element.

These and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a drawing in cross-section of the present invention, disclosing the general shape of the elements comprising it and their spatial relationship.

FIG. 2 is an oblique perspective view of the present invention as it would appear in use.

FIG. 3 is a view in cross-section of a space to be heated with the present invention suspended above a cement floor, showing temperatures at selected distances from the heating elements at selected times after turn-on.

DETAILED DESCRIPTION OF THE PRESENT INVENTION

Turning now to FIG. 1, we see the present invention 10, comprising a triangularly shaped heating element 12 and insulator means 14. Insulator means 14 comprises reflector/bracket means 16 and shaped insulation means 18.

Heating element 12 has substantially the shape of an equilateral triangle, with vertices 20, 22, and 24, and planar sides 26, 28, and 30, opposite said vertices, respectively. Interior space 32 is a passage for an energy source (not shown), such as hot water, steam, hot stack gases or any other available source of infrared energy.

Insulator means 14 is comprised of reflector/bracket means 16 and shaped insulation means 18 mounted therein. Reflector/bracket means 16 has engaging means 34 and 34a which accept vertices 22 and 24, respectively, of heating element 12, and web means 36, which is a combination reflector and support for insulation means 18.

It will be apparent to those skilled in the art that the heat radiated from vertex 20 will be less intense than that radiated from planar surfaces 28 and 30. In fact, there is a substantial uniformity of temperature over an area on either side of a line directly under the heater element 12 which is nearly equal to five times the separation of the heater element from the surface. This feature will be examined in more detail hereinafter.

The structure of insulator means 14 takes advantage of two basic characteristics of smooth radiating surfaces:

heat transfer between two bodies at different temperatures is proportional to the fourth power of the temperature difference; and radiation from a surface is normal to the surface except in the region of the edges.

Examining the structure of insulator means 14 from the standpoint of the first of these characteristics, we see that the lower surface of the web 36 is separated from the upper planar surface 26 of the heater element 12 by a substantial air space. This lower surface of the web 36 has a highly reflective surface, and redirects the major portion of the upward directed heat energy from planar surface 26 back toward heater element 12. However, some of the heat is absorbed by the web 36, is diffused throughout the body of the reflector/bracket means 16, with the result that the temperature of means 16 increases toward the temperature of the heater element 12. As it does, less and less heat energy will be lost in that direction; in fact, because of the fourth power law mentioned hereinbefore, the decrease in heat loss will be very rapid. Eventually, the only heat lost in the upward direction will be determined by the heat conductivity of the insulator 18. There are many poor heat conductors available, and one can be chosen to meet any particular requirements necessary.

Of course, some heat will be lost as a result of radiation from the reflector/bracket means 16. However, since the extended planar surfaces 38 and 40 of the reflector/bracket means 16 are chosen to have the same angle as, and therefore be an extension of, the planar surfaces 28 and 30, respectively, of heating element 12, we find that the effect of the increasing temperature of means 16 is to increase the width of planar surfaces 28 and 30. Consequently, rather than the heat radiation of the body of reflector/bracket means 16 being lost, most of it acts to increase the directional character of the heat radiation from the heating element 12 and thus extend its useful effects to a greater distance. It will be seen that this structure takes advantage of the second of the basic characteristics of smooth radiating surfaces noted above.

It will also be seen by those skilled in the art that the form of the reflector/bracket means lends itself to suspending the heater elements in any of several convenient ways, so that they can be extended a considerable distance, as indicated in FIG. 2, which also discloses a typical mounting.

FIG. 3 discloses in greater and specific detail the temperature distribution which will be obtained when a heating system constructed in accordance with the teachings of the invention is placed in a typical workspace, such as, for example, an auto repair shop or a greenhouse. It will be noticed that the variation in temperature in a lateral direction is very small, even a relatively short time after the system is turned on, and that the rise in temperature after several hours is also relatively small.

These results can be contrasted with those obtained by an experimental square tube, oriented at a 45° angle with respect to the surface to be heated, and by an existing system constructed in accordance with the system disclosed in U.S. Pat. No. 4,319,125. The experimental square tube, using an insulated reflector, had a lateral temperature difference of at least 3° over the same area as depicted in FIG. 3, and a temperature rise of 7° at the center and 4° at the edges, after a period of six hours. The system disclosed in U.S. Pat. No. 4,319,125 has a temperature difference of 10°–15° F. over the same area as depicted in FIG. 3 one hour after turn-on, and a temperature rise of from 10° to 15° six hours after turn-on. It will be appreciated by those skilled in the art that such differences create difficult control problems, especially for such uses as in greenhouses, where damage to growing plants translates into economic losses for the grower. It will also be appreciated that the savings accruing to a grower, both is reduced losses and economy of installation and operation, by use of the present invention, would be substantial.

It will be understood that the terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What I claim as my invention is:

1. Insulated reflector means for a triangularly shaped space heating element for greenhouses having:
   I. three vertices, and having therebetween and opposite therefrom three planar surfaces;
   II. one of said vertices being directed toward an area to be heated;
   said reflector means comprising:
   a. a web connecting two of said three planar sides, and having a flattened H-shape;
      1. said web being substantially parallel to one of said three planar surfaces opposite said one of said vertices and having reflective qualities on the surface adjacent thereto;
      2. said two planar sides being co-extensive and coplanar with two of said three planar surfaces, said two of said three planar surfaces defining said one of said vertices; and
   b. shaped insulation means adjacent said reflector means on the side thereof opposite said one of said three planar surfaces.

2. The insulated reflector means of claim 1, wherein said reflector means forms, with said web and said two planar sides, a receptacle for holding said shaped insulation means.

3. The insulated reflector means of claim 2, wherein said receptacle and said shaped insulation means have, in cross-section normal to said triangularly shaped space heating element, substantially the shape of an inverted isoceles trapezoid.

4. The insulated reflector means of claim 1, wherein said shaped insulation means is effective to permit said reflector means substantially to attain the temperature of said heating element.

5. A radiant space heating structure for greenhouses, consisting essentially of:

a. a linearly extended rigid tubular heating member with three vertices having therebetween and opposite therefrom three planar surfaces, said tubular member forming a passage for the flow therethrough of an energy source and having a substantially equilateral triangular shape in cross-section thereof;
 1. one of said vertices being directed toward an area to be heated so that a plane passing substantially normally from said area through said one of said three vertices is substantially normal to one of said three planar surfaces opposite to said one of said vertices, said one of said three planar surfaces being substantially parallel to said area to be heated, said one of said three planar surfaces having adjacently located thereto but spaced therefrom;
b. insulator means, said insulator means including:
 1. reflector means having a web connecting two planar sides and having a flattened H-shape:
  A. said web being substantially parallel to said one of said three planar surfaces and having reflective qualities on the surface adjacent thereto;
  B. said two planar sides:
   I. being coextensive and coplanar with two of said three planar surfaces; and
   II. forming, with said web, a receptacle having, in cross-section normal to said triangularly-shaped space heating element, substantially the shape of an inverted isoceles trapezoid; and
 2. shaped insulation means having substantially said shape of an inverted isoceles trapezoid, and fitting in said receptacle.

6. A radiant space heating structure comprising:
a. a linearly extended rigid tubular heating member, said tubular member forming a passage for the flow therethrough of an energy source and having:
 1. substantially an equilateral triangular shape in cross-section thereof, including:
  A. three vertices having:
   I. therebetween and opposite therefrom three planar surfaces;
   II. one of said vertices being directed toward an area to be heated so that a plane passing substantially normally from said area through said one of said three vertices is substantially normal to one of said three planar surfaces opposite to said one of said vertices, said one of said three planar surfaces being substantially parallel to said area to be heated;
b. insulator means being located adjacent to but spaced from said one of said three planar surfaces, said insulator means including:
 1. reflector means having a web connecting two planar sides and having a flattened H-shape:
  A. said web being substantially parallel to said one of said three planar surfaces and having reflective qualities on the surface adjacent thereto;
 2. insulation means adjacent said reflector means on the side thereof opposite to said one of said three planar surfaces;
 3. said two planar sides:
  A. being coextensive with and substantially parallel to two of said three planar surfaces defining said one of said three vertices; and
  B. having engaging means thereon for engaging vertices other than said one of said vertices.

7. A radiant space heating structure, comprising:
a. a linearly extended rigid tubular heating member, said heating member forming a passage for the flow therethrough of an energy source, having:
 1. substantially an equilateral triangular shape in cross-section thereof, including;
  A. three vertices having:
   I. therebetween and opposite therefrom three planar surfaces:
   II. one of said vertices being directed toward an area to be heated so that a plane passing substantially normally from said area through said one of said three vertices is substantially normal to one of said three planar surfaces opposite to said one of said vertices, said one of said three planar surfaces being substantially parallel to said area to be heated;
b. insulator means being located adjacent to but spaced from said one of said three planar surfaces, said insulator means including:
 1. reflector means having a web connecting two planar sides and having a flattened H-shape:
  A. said web being substantially parallel to said one of said three planar surfaces and having reflective qualities on the surface adjacent thereto;
 2. insulation means adjacent said reflector means on the side thereof opposite to said one of said three planar surfaces;
 3. said two planar sides:
  A. being coextensive with and substantially parallel to two of said three planar surfaces defining said one of said three vertices; and
  B. having engaging means thereon:
   I. wherein said engaging means include bifurcated edges for engaging said vertices other than said one of said vertices.

8. A radiant space heating structure, consisting essentially of:
a. a linearly extended rigid tubular heating member, said heating member forming a passage for the flow therethrough of an energy source, and having:
 1. substantially an equilateral triangular shape in cross-section thereof, including;
  A. three vertices having:
   I. therebetween and opposite therefrom three planar surfaces;
   II. one of said vertices directed toward an area to be heated so that a plane passing substantially normally from said area through said one of said three vertices is substantially normal to one of said three planar surfaces opposite to said one of said vertices, said one of said three planar surfaces being substantially parallel to said area to be heated;
b. insulator means located adjacent to but spaced from said one of said three planar surfaces, said insulator means including:
 1. reflector means having a web connecting two planar sides and having a flattened H-shape:
  A. said web being substantially parallel to said one of said three planar surfaces and having reflective qualities on the surface adjacent thereto;

B. insulation means adjacent said reflector means on the side thereof opposite to said one of said three planar surfaces;

C. said two planar sides being coextensive with and substantially parallel to two of said three planar surfaces defining said one of said three vertices.

9. The radiant heating structure of claim 8, wherein said two planar sides have engaging means thereon for engaging vertices other than said one of said vertices.

10. Mounting means for a triangularly-shaped space heating element for greenhouses having three vertices and having therebetween and opposite therefrom three planar surfaces, one of said vertices being directed toward an area to be heated, comprising:

a. a flattened H-shaped structure having a web connected to two planar sides;

b. said web being substantially parallel to a planar surface opposite said one of said vertices, and each of said two planar sides being coextensive with and substantially co-planar to one of said two of said three planar sides defining said one of said vertices; and c. engaging means on said two planar sides for engaging vertices other than said one of said vertices.

11. The engaging means of claim 10 or 8 wherein said two planar sides include bifurcated edges for engaging said vertices other than said one of said vertices.

* * * * *

UNITED STATES PATENT AND TRADEMARK OFFICE
CERTIFICATE OF CORRECTION

PATENT NO. : 4,770,233

DATED : September 12, 1988

INVENTOR(S) : HAROLD W. HANSEN

It is certified that error appears in the above-identified patent and that said Letters Patent is hereby corrected as shown below:

Title page, item [22] should read -- Filed:   September 8, 1983 --

Signed and Sealed this

Thirtieth Day of October, 1990

*Attest:*

HARRY F. MANBECK, JR.

*Attesting Officer*  *Commissioner of Patents and Trademarks*